June 1, 1937. L. G. PONCE 2,082,596
REAR VIEW MIRROR SUPPORT
Filed April 2, 1936
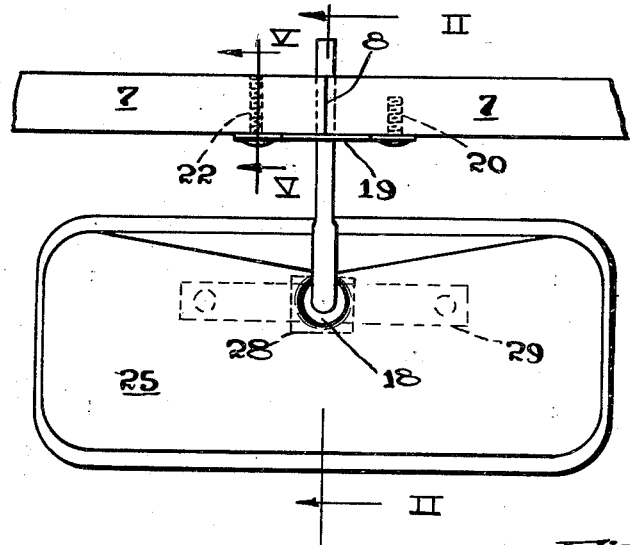
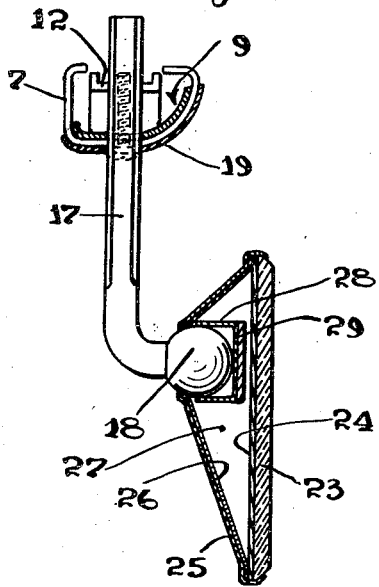
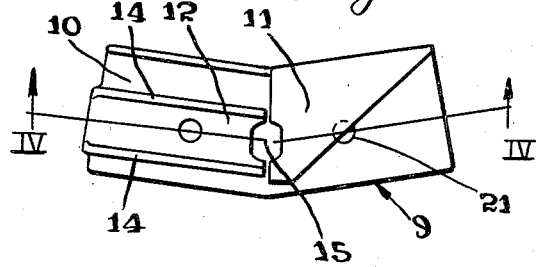
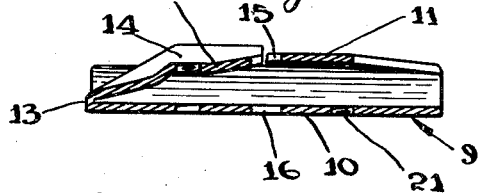
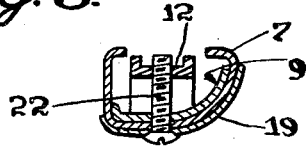
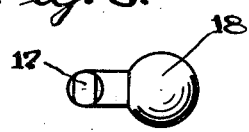
INVENTOR.
LUCIAN G. PONCE
BY James C. Bradley
ATTORNEY.

Patented June 1, 1937

2,082,596

UNITED STATES PATENT OFFICE 2,082,596

REAR VIEW MIRROR SUPPORT

Lucien G. Ponce, Follansbee, W. Va., assignor to Liberty Mirror Works, a corporation of Pennsylvania Application April 2, 1936, Serial No. 72,282

10 Claims. (Cl. 248—288)

The invention relates to a rear view mirror support for automobiles. It has for its principal objects the provision of an improved mounting of very cheap, simple construction which provides for a wide range of vertical adjustment; which is very secure against displacement in its various positions of adjustment; and which provides a reinforcing for the meeting ends of the header bar when such header bar is in two sections which meet at an obtuse angle in certain types of motor body design. A further object is the provision of a construction of the kind specified, in which the clamping means for the ball shank is concealed in the header bar, thus leaving the space between the mirror body and header bar free from obstruction rendering the appearance clean cut, avoiding surfaces for the collection of dust and facilitating in cleaning of the mirror parts and header bar. One embodiment of the invention is illustrated in the accompanying drawing, wherein:

Figure 1 is a rear view of the mirror, as seen from the front side of the car. Fig. 2 is a section on the line II—II of Fig. 1. Figs. 3 and 4 are detail views of the shell which is located in the header bar and acts as a clamp, Fig. 3 being a plan view and Fig. 4 a section on the line IV—IV of Fig. 3. Fig. 5 is a section on the line V—V of Fig. 1. And Fig. 6 is a plan view of the ball rod or stud.

Referring to the drawing 7, 7 are the parts of the header bar which meet at the line 8 and in plan lie at an obtuse angle of about the degree indicated by the line IV—IV of Fig. 3, which corresponds to the angle of the two halves of the windshield in certain types of body design. The header bar shown is of the hollow type opening upward (Fig. 2), and in the header bar sections where they meet is the shell 9 which fits the contour of the inner surface of the header bars and constitutes the clamping means for the ball stud or bar which carries the mirror. This shell is formed of relatively heavy sheet metal shaped as indicated in Figs. 3, 4, and 5.

The base portion 10 of the shell carries a fixed horizontal arm or abutment 11 of triangular shape, and opposite the end of this arm is a second arm 12 connected at 13 to the base portion of the shell, the arm being designed to pivot around the point 13 against the spring of the metal. This arm is stiffened by upright ribs 14 to insure that it will bend at the point 13. The opposing ends of the arms 11 and 12 are provided with the opening 15 for the passage of the ball arm, and a similar opening 16 is provided (Fig. 4) through the base of the shell in alinement with the opening 15.

Extending vertically through the openings 15 and 16 and through a similar perforation in the bottom walls of the header bar sections, is the ball rod or stem 17 which is of the non-circular cross section shown in Fig. 6, so as to fit the openings 15 and 16. This is the preferred cross section, as it insures the rod against turning, but in some cases, it may be desirable to make the bar of circular cross section to permit the adjustment of the mirror about a vertical axis. The lower end of the bar is turned laterally (Fig. 2) and provided with a ball 18 in order to give a universal mounting in the mirror casing, as later described.

Lying beneath the meeting ends of the header bars is a plate 19 which fits the contour of the lower faces of the bars and is perforated to permit the passage of the rod 17. The plate is clamped rigidly to the header bar 7 by means of a screw 20 20 which is threaded at its upper end into the shell 9, such shell being perforated and threaded, as indicated at 21 (Fig. 4). Extending through the other side of the plate 19 is the screw 22 which passes through perforations in the header bar and bottom wall of the shell and is threaded through the spring arm 12. This provides the means for clamping and releasing the rod 17. When the screw is loosened, the arm 12 lies with its end spaced away from the end of the arm 11, so that the rod can slide freely through the opening 15. When the screw is tightened, the arm 12 is swung downward about the point 13 against the spring of the metal, so that the opening 15 is reduced in diameter and the bar is clamped between the ends of the arms. This provides a secure clamp, as any force applied to the rod tending to move it downward, tends to swing the arm 12 downward due to the friction between the bar and the end of the arm, thus increasing the clamping action. It will be observed that the shell 9 and plate 19 overlie the joint 8 between the header bar sections 7, 7, so that when these members are secured in clamping relation by the screws 20 and 22, a very substantial reinforcing is provided for the joint. To improve the splice action, the shell 9 fits the inner contour of the header bars and the plate 19 fits the outer contours thereof, as heretofore pointed out.

The mirror construction, as shown in Fig. 2, comprises the glass plate 23, a paper sheet 24, a backing sheet 25 of thin sheet metal having its edges spun around the beveled edges of the glass sheet, and a stiffener plate 26 of sheet metal which is of heavier metal than the backing sheet 25 and acts as a reinforcing therefor. Lying in the space 27 between the paper sheet 24 and the stiffener plate 26 is a box 28 of sheet metal which fits around the ball 18, and acts as its housing. This box is pressed yieldingly to the left (Fig. 2) by a horizontal leaf spring 29 whose two ends are riveted to the stiffener plate on either side of the box 28. This is a common construction for giving a clamping action on the ball of a ball joint in mirror brackets and any suitable housing for the ball might be substituted at this point, the present invention not being concerned with the mirror backing or the housing for the ball.

The construction shown is capable of considerable modification without departing from the invention. Various other forms of wedge clamping means may be substituted for the one shown. The cross section of the ball rod may be changed to suit requirements and a round shank may, in many cases, be used to advantage. The long shank with a wide range of adjustment is particularly useful in connection with truck rear vision mirrors and permits the one mounting to be used with all windshield construction. Nuts may be used in connection with the screws 22 and 24 and the shell 9, in lieu of tapping the shell, if desired, and the screws may be burred at the ends to prevent them from being entirely withdrawn, such expedients being well known in allied arts. The rod 17 is shown as perpendicular, but on occasion, it may depart somewhat from the position which change merely requires a slight shift in the relative positions of the perforations 16 and 1. The position of the mirror may also be shifted slightly by bending the neck of the rod 17 just back of the ball 18. In all cases, however, the fundamentals of the device are the same, namely the upright stud bar adjustable through the header bar with the clamp located in or above such header bar, and operable from the exterior of the header bar by a screw device. The header bar shown is of the hollow type, but the ordinary strip type may be used.

What I claim is:

1. A rear view mirror support adapted to be applied to a metal header bar having a perforation therethrough, comprising an upright rod extending slidably through said perforation and provided with a ball joint member at its lower end for attachment to a mirror casing, a clamp member for the rod on the upper side of the header bar mounted for movement relative to the rod and adapted in one position to engage the rod and in another position to release it, and a screw for moving the clamp member operably from the lower side of the header bar.

2. A rear view mirror support adapted to be applied to a metal header bar having a perforation therethrough, comprising an upright rod extending slidably through said perforation and having its lower end bent laterally and provided with a ball joint member at its lower end for attachment to a mirror casing, a clamp member for the rod on the upper side of the header bar mounted for movement relative to the rod and adapted in one position to engage the rod and in another position to release it, and a screw for moving the clamp member operable from the lower side of the header bar.

3. A rear view mirror support adapted to be applied to a metal header bar having a perforation therethrough, comprising an upright rod extending slidably through said perforation and provided with a ball joint member at its lower end for attachment to a mirror casing, a clamp for the rod on the header bar comprising an abutment on the upper side of the header bar adapted to engage one side of the rod and an arm mounted for swinging movement up and down with its end in opposition to said abutment and adapted to engage the rod and clamp it against the abutment when the arm is moved downward, and a screw member extending through the header bar and engaging the arm for moving it down to clamp the rod when the member is rotated.

4. A rear view mirror support adapted to be applied to a bar having a perforation through its wall, comprising an upright rod extending slidably through said perforation and provided with a ball joint member at its lower end for attachment to a mirror casing, a clamp for the rod on the header bar comprising an abutment above the header bar adapted to engage one side of the rod and an arm mounted for swinging movement up and down with its end in opposition to said abutment and adapted to engage the rod and clamp it against the abutment when the arm is moved downward, and a screw member extending through the header bar and engaging the arm for moving it down to clamp the rod when the member is rotated, said rod being of non-circular cross section and fitting said perforation so that the rod is held against rotation.

5. A rear view mirror support adapted to be applied to a horizontal metal header bar having a horizontal wall with a perforation therethrough, comprising a clamp seated on said horizontal wall and provided with a spring arm, an upright rod extending slidably through said perforation and past said arm and provided at its lower end with a ball joint member for engaging a mirror casing, and a screw extending through the header bar engaging said spring arm for moving it into clamping engagement with said rod and operable from the lower side of the header bar.

6. A rear view mirror support adapted to be applied to a horizontal metal header bar having a bottom wall with a perforation therethrough, comprising a clamp seated on said bottom wall and provided with a spring arm, an upright rod extending slidably through said perforation and past said arm and provided at its lower end with a ball joint member for engaging a mirror casing, and a screw extending through said bottom wall engaging said spring arm for moving it into clamping engagement with said rod and operable from the lower side of the header bar, said rod being of non-circular cross section and fitting said perforation so that the rod is held against rotation.

7. A rear view mirror support adapted to be applied to a hollow metal header bar open on its upper side and provided with a perforation through its bottom wall, comprising an upright rod extending slidably through said perforation and provided with a ball joint member at its lower end for attachment to a mirror casing, a clamp for the rod in the header bar comprising an integral sheet metal member consisting of a pair of arms whose ends lie in opposition above said perforation and receive the rod between them, one of said arms being fixed and the other being movable downward against the spring of the metal in such manner that its end approaches the end of the fixed arm in such downward movement, and a screw member extending through the bottom wall of the header bar operable from the lower side thereof and engaging the arm for moving it down to clamp the rod when the member is rotated.

8. A rear view mirror support adapted to be applied to a header bar made up of two hollow metal members which meet at an obtuse angle with a perforation through the bottom walls thereof where such bottom walls meet, comprising an upright rod extending slidably through said perforation and provided with a ball joint member at its lower end for attachment to a mirror casing, a clamp for the rod in the header bar comprising a shell of sheet metal fitting the interior of the header bar members at their juncture and having two arms integral with the shell whose ends lie in opposition above said perforation and receive the rod therebetween, one of said arms being fixed and the other being movable downward against the spring of the metal in such manner that its end approaches the end of the fixed arm in such movement, means for securing the shell rigidly to one of the header bar members, and a screw extending upward through the bottom of the other header bar member and the shell engaging the movable arm and operable from the lower side of the header bar, all so arranged that said shell acts as a connection and reinforcing for the header bar members at their meeting ends.

9. A rear view mirror support adapted to be applied to a header bar made up of two hollow metal members which meet at an obtuse angle with a perforation through the bottom walls thereof where such bottom walls meet, comprising an upright rod extending slidably through said perforation and provided with a ball joint member at its lower end for attachment to a mirror casing, a clamp for the rod in the header bar comprising a shell of sheet metal fitting the interior of the header bar members at their juncture and having two arms integral with the shell whose ends lie in opposition above said perforation and receive the rod therebetween, one of said arms being fixed and the other being movable downward against the spring of the metal in such manner that its end approaches the end of the fixed arm in such movement, a screw extending upward through the bottom of one of the header bar members for securing the shell rigidly thereto, a second screw extending upward through the bottom of the other header member and the shell and engaging said movable arm and operable from the lower side of the header bar, and a plate fitting around the bottoms of the header bar members and overlying their line of joinder through which said screws also extend, all so arranged that said shell and said plate in conjunction with said screws act as a reinforcing for the header bar members at their meeting ends.

10. A rear view mirror support adapted to be applied to a horizontal bar having a vertcial perforation therethrough, comprising an upright ball stud for carrying the mirror extending slidably through said perforation, a movable clamp member mounted on the upper side of the bar adjacent said perforation and adapted in one position to engage the stud and in another position to release it, and a screw for moving the clamp member extending vertically through the bar with its head on the lower side thereof.

LUCIEN G. PONCE.